United States Patent [19]
Choi

[11] Patent Number: 5,901,132
[45] Date of Patent: May 4, 1999

[54] PICKUP HEAD HAVING TWO LASER LIGHT SOURCES FOR SEPARATELY READING AN OPTICAL DISK WITH TWO RECORDING LAYERS

[75] Inventor: Yang-Oh Choi, Seoul, Rep. of Korea

[73] Assignee: Daewoo Electronics, Co., Ltd., Seoul, Rep. of Korea

[21] Appl. No.: 08/556,684

[22] Filed: Nov. 13, 1995

[30] Foreign Application Priority Data

Nov. 11, 1994 [KR] Rep. of Korea ..................... 94-29492

[51] Int. Cl.⁶ ........................................... G11B 7/00
[52] U.S. Cl. ..................... 369/124; 369/44.37; 369/94; 369/116
[58] Field of Search ............................ 369/44.37, 44.38, 369/94, 120, 110, 112, 116, 124

[56] References Cited

U.S. PATENT DOCUMENTS

| | | | |
|---|---|---|---|
| 5,485,452 | 1/1996 | Maeda | 369/275.1 |
| 5,526,336 | 6/1996 | Park et al. | 369/112 |
| 5,627,814 | 5/1997 | Lee | 369/116 |

*Primary Examiner*—Tod R. Swann
*Assistant Examiner*—Kim-Kwok Chu
*Attorney, Agent, or Firm*—Pennie & Edmonds LLP

[57] ABSTRACT

An optical pickup system for regenerating information stored on an optical disk including a pair of recording surfaces thereon, is provided with a pair of light sources, a detector, an objective lens, a signal detection unit, and a beam splitter having a first and a second recording surface. In this system, when the first light source is used for reproducing an information signal on the first recording surface of the optical disk, the first light beam transmitted through the second surface of the beam splitter is used for detecting the focusing error signal of the first recording surface of the optical disk. When the second light source is used for detecting the focusing error signal of the second recording surface of the optical disk, the second light beam reflected from the second surface of the beam splitter is utilized for reproducing an information signal on the second recording surface with the first light source turned off.

20 Claims, 4 Drawing Sheets

PICKUP HEAD HAVING TWO LASER LIGHT SOURCES FOR SEPARATELY READING AN OPTICAL DISK WITH TWO RECORDING LAYERS

FIELD OF THE INVENTION

The present invention relates to an optical pickup system; and, more particularly, to a novel optical pickup system capable of driving an optical disk with a pair of recording surfaces.

DESCRIPTION OF THE PRIOR ART

In FIG. 1, there is shown an optical pickup system 10 capable of reproducing a signal from an information storage area on a conventional optical information recording disk, disclosed in a copending commonly owned application, U.S. Ser. No. 08/339,620, now U.S. Pat. No. 5,568,462, issued on Oct. 22, 1996, entitled "IMPROVED KNIFE EDGE METHOD FOR USE IN DETECTING A FOCUSING ERROR IN AN OPTICAL PICKUP SYSTEM", which is incorporated herein by reference. The optical pickup system 10 comprises a light source 12, an objective lens 16, an optical disk 19, a knife edge 20 having a reflection surface 34, a differential amplifier 28 and an optical detector 22 provided with a reception surface 27. In the system 10, a light beam 13 emitted from the light source 12 impinges onto the knife edge 20 and is partially reflected by a reflection surface 34 incorporated therein. The reflected light beam 15 from the reflection surface 34 is transmitted through the objective lens 16 onto a recording surface 18 of the optical disk 19 as a focused light beam. The focused light beam, reflected from the recording surface 18 of the optical disk 19, is converged by the objective lens 16 and then passes by the knife edge 20. The focused light beam passed by the knife edge 20 impinges on the reception surface 27 of the optical detector, the reception surface 27 including a first and a second photoelectric cells 32, 33. Output from the first and second photoelectric cells are sent to a pair of input ports 24, 26 on the differential amplifier 28 which generates a focusing error signal by comparing the outputs from the first and second photoelectric cells of the optical detector.

One of the major difficulties of the above-described optical pickup system 10 lies in the shortage of information recording area. To overcome this problem, use of an optical disk having a multiple number of information storage layers has been proposed. In FIG. 2, there is shown a cross sectional view of an optical disk with a pair of reflection hologram films, often referred to as a hologram disk, for use in an optical pickup system, disclosed in a copending commonly owned application, U.S. Ser. No. 08/340,941, now abandoned, entitled "OPTICAL DISK WITH A REFLECTION HOLOGRAM FILM AND METHOD OF MANUFACTURING THE SAME". The hologram disk 50 comprises a substrate 52, a first reflection hologram film 54, a transparent intermediate layer 56, a second reflection hologram film 58 and a transparent protective layer 59, wherein each of the first and the second reflection hologram films is capable of reflecting the light beam of a certain wavelength and letting others pass through. As shown, a light beam I having a wavelength $\lambda_1$ from the optical pickup system is passed through the transparent protection layer 59, the second reflection hologram film 58 and the transparent intermediate layer 56 to reach the first reflection hologram film 54; and is then reflected back to the optical pickup system. On the other hand, a light beam II having a wavelength $\lambda_2$ from the optical pickup system is passed through the transparent protection layer 59 to reach the second reflection hologram film 58; and is then reflected back to the optical pickup system to thereby double the information storage area in comparison with the conventional optical disk which consists of only one layer for reflecting.

SUMMARY OF THE INVENTION

It is, therefore, a primary object of the present invention to provide a novel optical pickup system capable of operating an optical disk having a pair of recording surfaces.

In accordance with the present invention, there is provided an optical pickup system for regenerating information stored on an optical disk including a first and a second recording surfaces thereon, each of the recording surfaces having a plurality of tracks aligned spirally or concentrically, comprising: a pair of light sources for generating a first and a second light beams, each of the light beams having different wavelengths; a detector, being placed opposite to the second light source, provided with a pair of photoelectric cells, each of the photoelectric cells being capable of measuring a light beam intensity and generating a corresponding output signal; a beam splitter, disposed between the first light source and the optical disk, provided with a first and a second surfaces, each of the surfaces being capable of reflecting a portion of the light beams and transmitting the remaining portion of the light beams, the first and the second surfaces arranged in such a way that they are inclined at a predetermined angle with respect to an optical axis formed by a middle point of an edge line formed by an intersection of the first and the second surfaces of the beam splitter and a respective convergence point of the first and the second light beams, the convergence point of the first light beam referring to a point on the first reflection surface on which the first light beam converges, and that of the second light beam referring to a point on the second reflection surface on which the second light beam converges, wherein the beam splitter divides the first light beam into a first and a second parts passed through the first and the second surfaces of the beam splitter, respectively, each of the parts being focused onto the first recording surface of the optical disk, the first part reflected from the first recording surface travelling toward the second light source via the second surface of the beam splitter, while the second part reflected from the first recording surface impinges onto the detector via the first surface of the beam splitter, the second light beam from the second light source is partially reflected to the second recording surface of the optical disk by the second surface of the beam splitter, the second light beam reflected by the second recording surface impinging onto the detector via the first surface of the beam splitter to thereby allow the detector selectively to generate the output signals in response to the information from each of the recording surfaces of the optical disk; an objective lens, disposed between the beam splitter and the optical disk, for focusing each of the light beams from the beam splitter and for converging each of the light beams reflected from each of the first and the second recording surfaces onto the surfaces of the beam splitter, respectively; and a signal detection unit, connected to the photoelectric cells of the detector, for generating a focusing error signal by comparing the output from each of the photoelectric cells.

BRIEF DESCRIPTION OF THE DRAWINGS

The present invention together with the above and other objects and advantages will become apparent from the following description of preferred embodiments given in conjunction with the accompanying drawings, wherein.

DETAILED DESCRIPTION OF THE PREFERRED EMBODIMENTS

Figure 1:
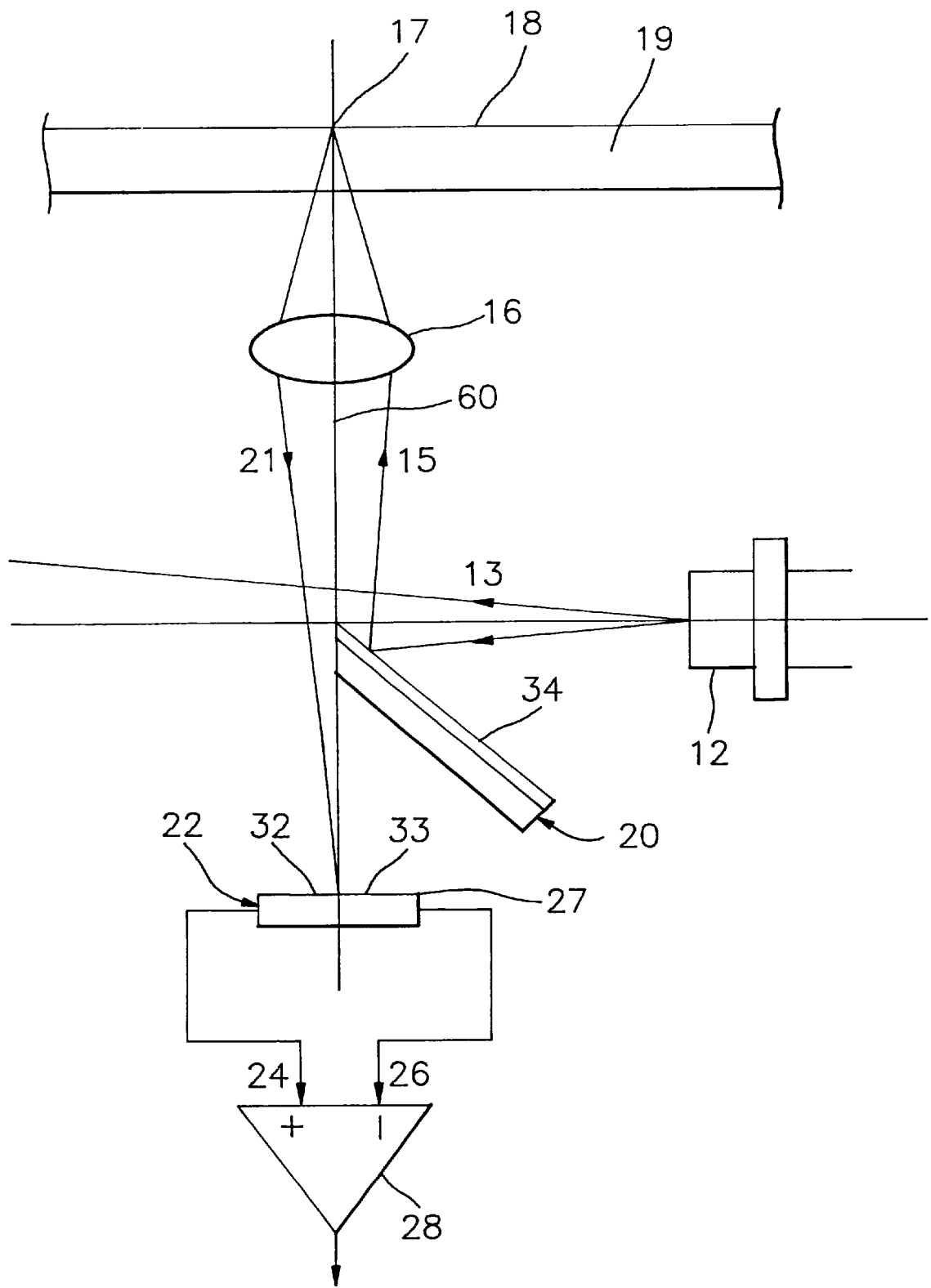
FIG. 1 represents a schematic side view of a prior art optical pickup system.
Figure 2:
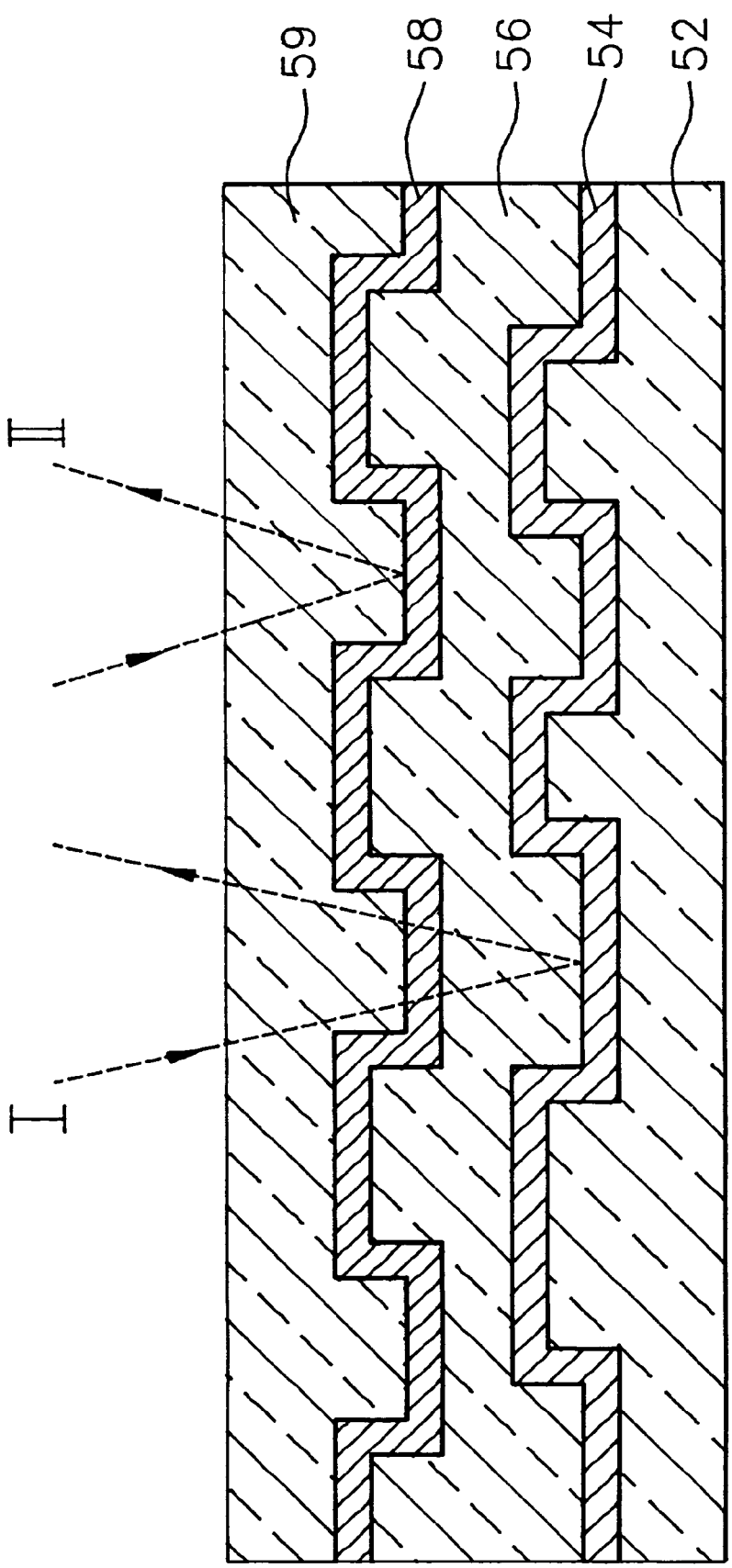
FIG. 2 illustrates a cross sectional view of an optical disk with a pair of recording surfaces.
Figure 3:
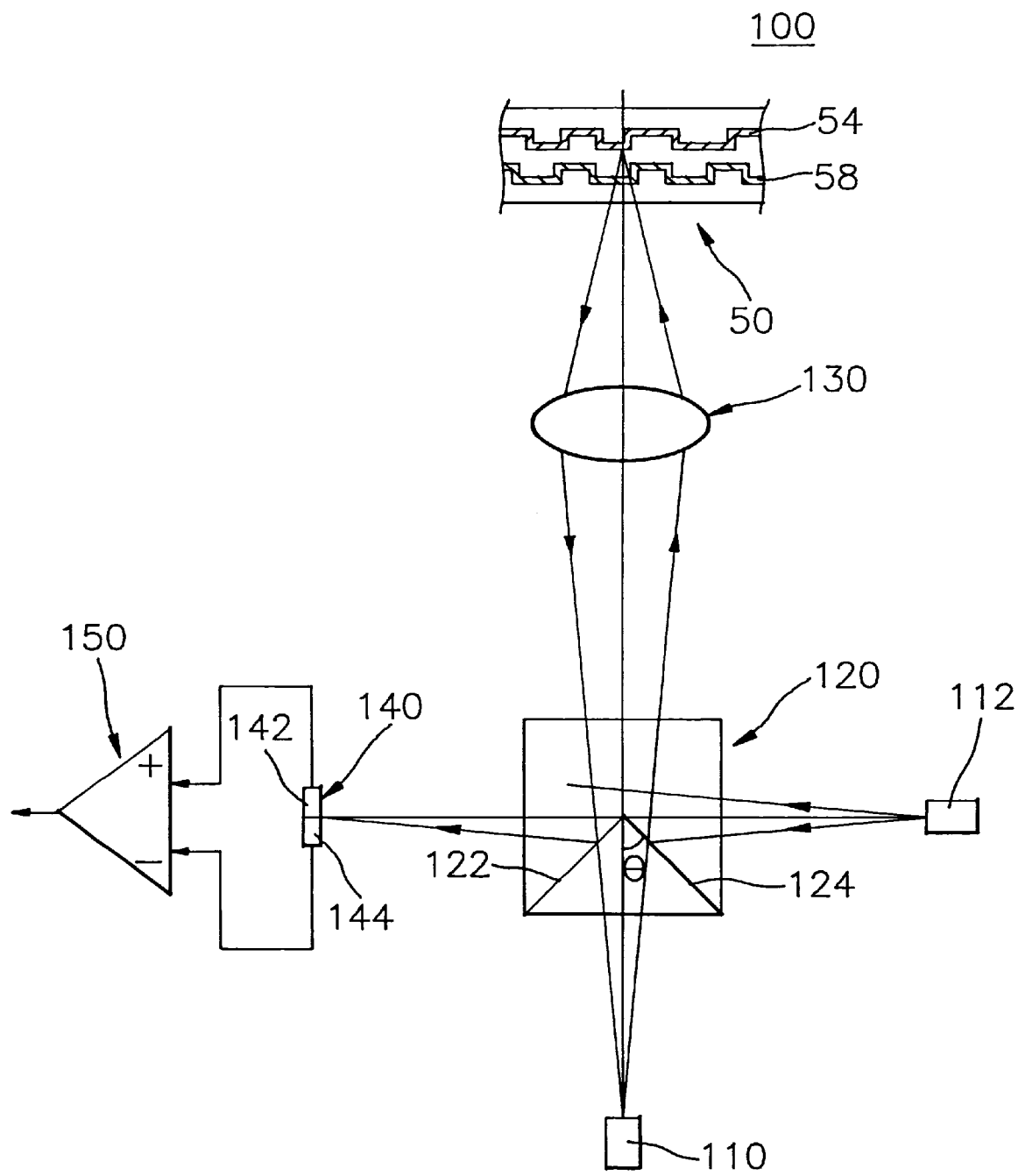
FIG. 3 depicts a schematic side view of an optical pickup system in accordance with a preferred embodiment of the present invention.
Figure 4A:
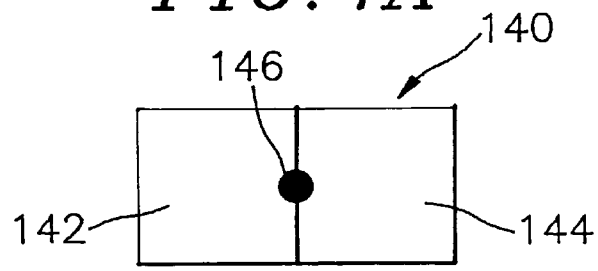
FIGS. 4A–4C exemplify beam spots impinging onto the reception surface of the detector.
Figure 4B:
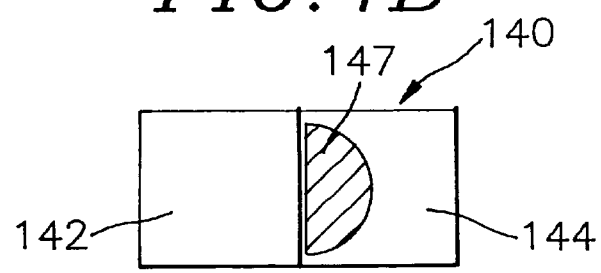
Figure 4C:
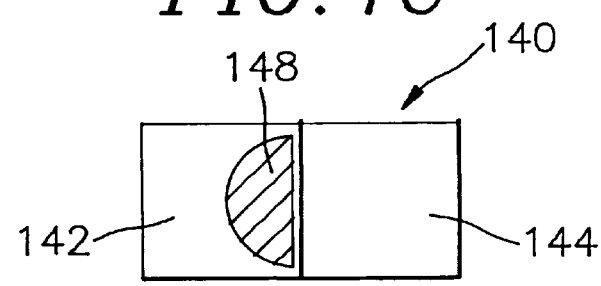
Figure 5:
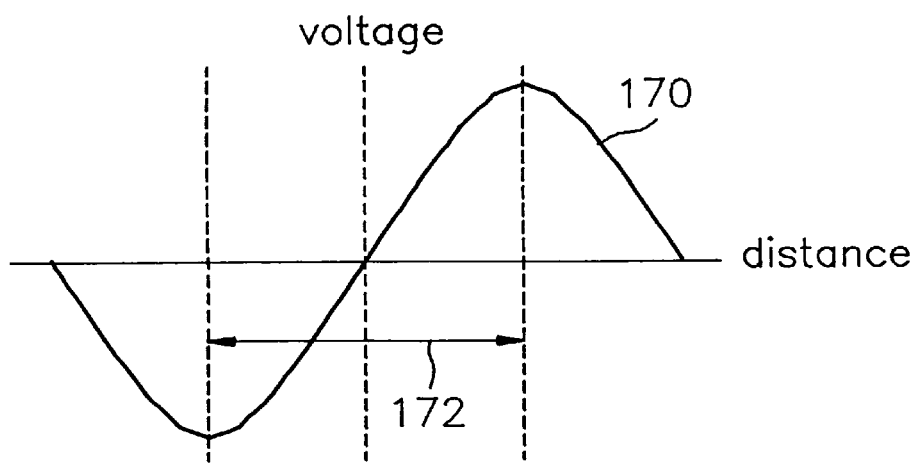
FIG. 5 shows the relationship between the displacement of the optical disk and the intensity variation of a focusing error signal.

There are illustrated in FIGS. 3 to 5 various views of the inventive optical pickup system in accordance with a preferred embodiments of the present invention.

As shown in FIG. 3, the optical pickup system 100 in accordance with the present invention comprises a first and a second light sources 110, 112, the first and the second light sources generating a first and a second light beams, respectively, having different wavelengths, e.g., $\lambda_1$, $\lambda_2$, a beam splitter 120 provided with a pair of surfaces 122, 124, each of the surfaces 122, 124 being capable of reflecting a portion of the light beams and transmitting the remaining portion thereof, an objective lens 130, an optical disk 50 including a first and a second recording surfaces 54, 58, a detector 140 provided with a first and a second photoelectric cells 142, 144 and a signal detection unit 150 including a pair of input ports.

In the system 100, when the first light source 110 reproduces a recorded information signal on the first recording surface 54 of the optical disk 50, the second light source 112 is turned off. In this case, the first light beam emitted from the first light source 110, e.g., a laser diode, enters the beam splitter 120. The beam splitter 120 is arranged in such a way that the first and the second surfaces thereof are inclined at a predetermined angle Θ with an optical axis formed by a middle point of an edge line formed by an intersection of the first and the second surfaces 122, 124 of the beam splitter 120 and a respective convergence point of the first and second light beams. The convergence point of the first light beam refers to a point on the first reflection surface on which the first light beam converges, and that of the second light beam, a point on the second recording surface on which the second light beam converges. It is preferable that Θ be 45 degrees. The first light beam is divided into a first and a second transmitted light beams passed partially through the first and second surfaces 122, 124 incorporated in the beam splitter 120, respectively. Each of the transmitted light beams passes through the second recording surface 58, which is transparent to the light beams having a wavelength other than $\lambda_2$. Therefore, each of transmitted light beams is focused onto the first recording surface 54 by the objective lens 130. Each of the transmitted light beams focused onto the first recording surface 54, which reflects only the light beam having the wavelength $\lambda_1$ and passes through the other light beams having different wavelengths, is reflected back to the objective lens 130 through the second recording surface 58. The first transmitted light beam, reflected back to the objective lens 130, then impinges onto the second surface 124 of the beam splitter 120. The first transmitted light beam is reflected by the second surface 124 and travels toward the second light source 112 to thereby prevent the detector 140 from receiving the first transmitted light beam as an output signal.

Meanwhile, the second transmitted light beam reflected back to the objective lens 130 by the first recording surface 54, then impinges onto the first surface 122 of the beam splitter 120. The second transmitted light beam onto the first surface 122 is then reflected to the detector 140 to thereby allow the detector 140 to receive the second transmitted light beam as an output signal.

As can be seen from the above, it should be appreciated that the edge line formed by the intersection of the first and second surfaces of the beam splitter serves as a conventional knife edge. The detector 140 includes the first and second photoelectric cells 142, 144. Each of the photoelectric cells 142, 144 is capable of generating an output in the form of a light beam intensity measurement. Outputs from the first and second photoelectric cells are sent to the pair of input ports on the signal detection unit 150 which generates a focusing error signal by comparing the outputs from the first and second photoelectric cells 142, 144 of the detector 140. As is well known, the regeneration information signal may be obtained by adding the outputs from the first and second photoelectric cells, and the tracking error signal is detectable by applying the push-pull method.

FIG. 4A shows the beam spot 146 impinging on the first and second photoelectric cells 142, 144 when the optical disk 50 is placed at the just focused position, generating a zero focusing error signal. If the optical disk 50 moves away from the just focused position, i.e., from the objective lens 130, the beam spot 147 impinges onto the second photoelectric cell 144 as shown in FIG. 4B. In the case when the optical disk 50 moves closer to the objective lens 130, the beam spot 148 impinges onto the first photoelectric cell 142, as illustrated in FIG. 4C.

In FIG. 5, there is illustrated a focusing error detecting signal curve 170 measured as a function of voltage and displacement. The arrow 172 therein indicates that a focus control distance range is about 15 $\mu$m.

Referring back to FIG. 3, in order to reproduce a recorded information from the second recording surface 58, the detector 140 reads the recorded information signal from the second recording surface 58 of the optical disk 50 with the second light source 112 turned on. In this case, the second light beam emitted from the second light source 112, e.g., a laser diode, enters the beam splitter 120, and is partially reflected by the second surface 124 incorporated in the beam splitter 120 into the objective lens 130. A portion of the second light beam is then focused by the objective lens 130 and impinges onto the second recording surface 58, which is transparent to the light beams having a wavelength other than $\lambda_2$. The portion of the second light beam focused onto the second recording surface 58 is reflected back to the objective lens 130 to thereby produce a reflected light beam. The reflected light beam is transmitted the first surface 122 through the objective lens 130 and is partially reflected to the detector 140 by the first surface 122 to thereby produce a focusing error signal for the second recording surface 58 of the optical disk 50.

Meanwhile, the remaining portion of the second light beam passing by the second surface 124 of the beam splitter 120 impinges onto the detector 140. The intensity of the remaining portion of the second light beam received at the detector 140 is processed as an offset signal by the signal detection unit 150. It should be noted that the other processes for detecting the focusing error signal of the second recording surface are similar to those of the first recording surface.

As described above, therefore, the inventive optical pickup system utilizing a pair of light sources can be used for reproducing information stored on an optical disk having a pair of recording surfaces.

While the present invention has been described with respect to the preferred embodiments, other modifications and variations may be made without departing from the spirit and scope of the present invention as set forth in the following claims.

What is claimed is:

1. An optical pickup system for regenerating information stored on an optical disk including a first and a second recording surfaces thereon, each of the recording surfaces having a plurality of tracks aligned spirally or concentrically, comprising:

a first and a second light source for generating a first and a second light beams, respectively, each of the light beams having a different wavelength;

an objective lens, disposed between the optical disk and the first light source, for focusing the first light beam on a first recording surface along with a first optical axis, wherein the first optical axis is defined as a line connecting the first light source with a focussing point of the first light beam on the first recording surface;

an optical detector, being placed opposite to the second light source with respect to the first optical axis, provided with a pair of photoelectric cells, each of the photoelectric cells for measuring a light beam intensity and generating a corresponding output signal defining a second optical axis connecting a center of the pair of photoelectric cells with the second light source;

a beam splitter, disposed between the first light source and the objective lens, provided with a first and a second surfaces, intersecting with each other along an edge line, a middle point of the edge line being passed through by the first and the second optical axis, each of the surfaces being capable of reflecting a portion of the light beams and transmitting the remaining portion of the light beams, wherein the beam splitter divides the first light beam into a first and a second parts thereof transmitted through the first and the second surfaces of the beam splitter, respectively, the first part impinging onto the second surface of the beam splitter after being reflected from the first recording surface and then transmitted through the objective lens, and the second part impinging onto the first surface of the beam splitter, the first surface of the beam splitter being arranged to be inclined with respect to the first optical axis in such a way that the second part of the first light beam impinging onto the first surface of the beam splitter to be focussed onto the optical detector after being reflected therefrom and the second surface of the beam splitter being adjusted to have an angle with respect to the first optical axis so that a portion of the second light beam after being reflected therefrom to be focussed through the objective lens onto the second recording surface of the optical disk, the second light beam thereafter being focussed onto the optical detector after first being reflected from the second recording surface of the optical disk, transmitted through the objective lens and then reflected from the first surface of the beam splitter to thereby allow the optical detector selectively to generate the corresponding output signal in response to the information from each of the recording surfaces of the optical disk; and an electrical signal detection unit, connected to the photoelectric cells of the optical detector, for generating a focusing error signal by comparing two photoelectric cell output signals.

2. The optical pickup system of claim 1, wherein the first and second surfaces of the beam splitter are arranged in such a way that each is inclined at an angle of 45 degrees relative to said first optical axis, thereby forming a 90 degree angle therebetween.

3. The optical pickup system of claim 1, wherein the second light source is turned off, while the first light source reproduces information signal from the first recording surface of the optical disk.

4. The optical pickup system of claim 1, wherein the first light source is turned off, while the second light source reproduces information signal from the second recording surface of the optical disk.

5. The optical pickup system of the claim 1, wherein the electric signal detection unit utilizes the intensity of the second light beam passing by the second surface as an offset signal.

6. The optical pickup system of the claim 1, wherein a tracking error signal is detectable by applying a push-pull method.

7. An optical pickup system for reading a regeneration information signal stored on an optical disk including a first and a second recording surfaces thereon, comprising:

a first light source for generating a first light beam, being located in a facing relationship with the optical disk;

an objective lens, disposed between the optical disk and the first light source, for focusing the first light beam on a first recording surface, thereby defining a first optical axis connecting the first light source with a focussing point of the first light beam on the first recording surface;

a beam splitter, disposed between the first light source and the objective lens, provided with a first and a second surfaces with a first predetermined opening angle therebetween, each of the surfaces being capable of reflecting a portion of the first light beam and transmitting the remaining portion of the first light beam, the beam splitter being arranged in such a way that the first surface is inclined at a second predetermined angle with respect to the first optical axis, which passes through a middle point of an edge line formed by an intersection of the first and the second surfaces of the beam splitter, wherein the beam splitter divides the first light beam into a first and a second parts thereof transmitted through the first and the second surfaces of the beam splitter, respectively, the first part impinging onto the second surface of the beam splitter after being first reflected from the first recording surface and then transmitted through the objective lens, and the second part onto the first surface of the beam splitter;

an optical detector, provided with a pair of photoelectric cells, each of the photoelectric cells for measuring a light beam intensity and generating a corresponding output signal to thereby obtaining the regeneration information signal by adding the corresponding output signals, wherein the optical detector is located at a focussing point of the second parts of the first light beam impinging onto the first surface of the beam splitter after being reflected therefrom; and a second light source for generating a second light beam with a wavelength different from that of the first light beam, being located at a position along a second optical axis, the second optical axis being defined as a line connecting the middle point of the edge line of the beam splitter with a focussing point of the first part of the first light beam reflected from the second surface of the beam splitter after being first reflected from the first recording surface of the optical disk and then transmitted through the objective lens, the position being adjusted in such a way that a portion of the second light beam reflected from the second surface of the beam splitter to be focussed on the second recording surface of the optical disk after being transmitted through the objective lens, thereafter the portion of the second light beam being detected by the optical detector after being first reflected from the second recording surface of the optical disk, transmitted through the objective lens and then reflected from the first surface of the beam splitter, thereby allowing the optical detector selectively reading the regeneration information signal from each of the recording surfaces of the optical disk.

8. The optical pickup system of claim 7, wherein the optical detector further comprises an electrical signal detection unit, connected to the photoelectric cells of the optical detector, for generating the regeneration information signal by adding two photoelectric cell output signals.

9. The optical pickup system of claim 8, wherein the second predetermined angle is 45 degrees.

10. The optical pickup system of claim 9, wherein the first predetermined opening angle is 90 degrees.

11. The optical pickup system of claim 10, wherein the second light source is turned off, while the first light source reproduces the regeneration information signal from the first recording surface of the optical disk.

12. The optical pickup system of claim 11, wherein the first light source is turned off, while the second light source reproduces the regeneration information signal from the second recording surface of the optical disk.

13. The optical pickup system of claim 12, wherein the electrical signal detection unit utilizes the intensity of the second light beam passing by the second surface as an offset signal.

14. The optical pickup system of claim 13, wherein a tracking error signal is detected by applying a push-pull method.

15. An optical pickup system for reading information stored on an optical disk having first and second recording surfaces, said optical pickup system comprising:

a first light source arranged to generate a first light beam at a first wavelength;

a beam splitter being disposed between the first light source and the optical disk along an optical axis extending therebetween, said beam splitter comprising first and second beam splitter surfaces intersecting at a point on said optical axis and forming a predetermined angle with respect to said optical axis;

a second light source positioned on a first side of said optical axis, said second light source arranged to generate a second light beam at a second wavelength, said first and second wavelengths being different; and an optical detector positioned on a second side of said optical axis, said detector arranged to sense an intensity of light reflecting off of said first beam splitter surface, said intensity of light representative of an information signal stored on one of said first and second recording surfaces.

16. The system of claim 15, wherein:

a first part of said first light beam is transmitted through said second beam splitter surface, impinges on and reflects off of said first recording surface, and then impinges on and reflects off of said first beam splitter surface, when said first source is turned on, and a first portion of said second light beam reflects off of said second beam splitter surface, impinges on and reflects off of said second recording surface, and then impinges on and reflects off of said first beam splitter surface, when said second source is turned on.

17. The system of claim 16, wherein the second light source is turned off when the first light source is turned on, and the first light source is turned off when the second light source is turned on.

18. The system of claim 16, wherein a second portion of said second light beam directly impinges onto said detector.

19. The system of claim 15, wherein said predetermined angle is 45°, and said first and second light sources are arranged at 90° to each other.

20. The system of claim 15, further comprising an objective lens positioned on said optical axis between said beam splitter and said recording surface.

* * * * *